United States Patent [19]

McManis, III et al.

[11] Patent Number: 4,535,037

[45] Date of Patent: Aug. 13, 1985

[54] LITHIUM-BORON ANODES IN NITRATE THERMAL BATTERY CELLS

[75] Inventors: George E. McManis, III; Aaron N. Fletcher; Melvin H. Miles, all of Ridgecrest, Calif.

[73] Assignee: The United States of America as represented by the Secretary of the Navy, Washington, D.C.

[21] Appl. No.: 674,375

[22] Filed: Nov. 23, 1984

[51] Int. Cl.$^3$ .............................................. H01M 4/36
[52] U.S. Cl. ..................................... 429/103; 429/112
[58] Field of Search .................................. 429/112, 103

[56] References Cited

U.S. PATENT DOCUMENTS

| | | | |
|---|---|---|---|
| 4,068,045 | 1/1978 | Abrams | 429/81 |
| 4,162,352 | 7/1979 | Sutula et al. | 429/29 |
| 4,260,667 | 4/1981 | Miles et al. | 429/112 |

OTHER PUBLICATIONS

Jour. Electrochem. Soc., vol. 131, No. 2, Feb. 1984, pp. 286-289, "The Lithium-Boron Alloy Anode in Molten Nitrate Electrolytes".
Journal of the Electrochemical Society, vol. 129, No. 6, p. 1168, *Discharge Characteristics of Lithium-boron Alloy Anode in Molten Salt Thermal Cells.*

*Primary Examiner*—Charles F. Lefevour
*Attorney, Agent, or Firm*—Robert F. Beers; W. Thom Skeer; Thomas W. Hennen

[57] ABSTRACT

A thermally activated electrochemical cell utilizes a lithium-boron anode and a molten nitrate electrolyte selected from the group consisting of lithium nitrate, a mixture of lithium nitrate and sodium nitrate, a mixture of lithium nitrate and potassium nitrate, and a mixture of lithium nitrate and sodium nitrate with potassium nitrate, to provide improved cell electrical performance. The electrolyte is contained on a fiberglass separator and the electrolyte adjacent to the cathode may contain silver nitrate as well. Current densities over 300 mA/cm$^2$ with a usable temperature range of over 150° C. have been obtained. Anode open circuit potentials of about 3.2 V were found with little polarization at 100 mA/cm$^2$ and with very slight polarization at 300 mA/cm$^2$.

2 Claims, 7 Drawing Figures

LITHIUM-BORON ANODES IN NITRATE THERMAL BATTERY CELLS

BACKGROUND OF THE INVENTION

1. Field of the Invention

This invention pertains to an electrochemical cell, and more particularly to an electrochemical cell which is thermally activated. With greatest particularity, the invention pertains to a thermally activated electrochemical cell which utilizes a lithium-boron anode and a molten nitrate electrolyte.

2. Description of the Prior Art

Thermal batteries utilizing molten nitrate as the electrolyte are well known. For example, see U.S. Pat. No. 4,260,667. Additionally, the use of lithium-boron alloy to construct the anode for a thermal battery is known. For example, see U.S. Pat. No. 4,162,352. However, until the present invention, no one had combined a lithium-boron alloy anode with a molten nitrate electrolyte in a thermal battery.

SUMMARY OF THE INVENTION

The present invention resides in a thermal battery cell which utilizes in an anode made from a lithium-boron alloy wherein the anode comprises approximately 65% by weight lithium, in combination with a molten nitrate electrolyte such as lithium nitrate ($LiNO_3$).

One object of the present invention is to provide an improved thermally activated electrochemical cell having superior electrical performance. Yet another object of the invention is to provide a thermally activated electrochemical cell having a stable anode potential over a temperature range of from 150° to 350° C. A still further object of the invention is to provide a thermally activated electrochemical cell having a low melting point, low toxicity, and an oxidizing electrolyte. Another object of the invention is to integrate extant molten nitrate thermal battery cell technology with the lithium-boron alloy anode material to achieve a thermal battery cell capable of the high cell voltages and high rate discharges characteristic of lithium anodes while retaining the low melting point and oxidizing advantages of the molten nitrate electrolyte.

Other objects and further scope of applicability of the present invention will become apparent from the detailed description of the preferred embodiment which follows. It should be understood, however, that the detailed description of the preferred embodiment, while indicating preferred embodiments of the invention, is given by way of illustration only, since various changes and modifications within the spirit and scope of the invention will become apparent to those skilled in the art. It should also be understood that the foregoing summary of the invention is for the purpose of providing a non-legal brief statement to serve as a searching-scanning tool for scientists, engineers and researchers and is not intended to limit the scope of the invention as disclosed herein, nor is it intended that it should be used in interpreting or in any way limiting the scope of fair meaning of the appended claims.

BRIEF DESCRIPTION OF THE DRAWING

The invention will be further described in conjunction with the accompanying drawing figures, in which.

DESCRIPTION OF THE PREFERRED EMBODIMENT

The present invention of a thermally activated electrochemical cell having a lithium-boron alloy anode and a molten nitrate electrolyte has been described in an open literature publication article entitled *The Lithium Boron Alloy Anode In Molten Nitrate Electrolytes*, which was printed in The Journal of the Electrochemical Society, Volume 131, No. 2, February 1984, herein incorporated by reference. Also, lithium-boron anodes for use in thermal batteries are described in U.S. Pat. No. 4,162,352 herein incorporated by reference. Further, thermal battery cells utilizing molten nitrates as the electrolyte and oxidizer have been described in U.S. Pat. No. 4,260,667 herein incorporated by reference.

Figure 1:
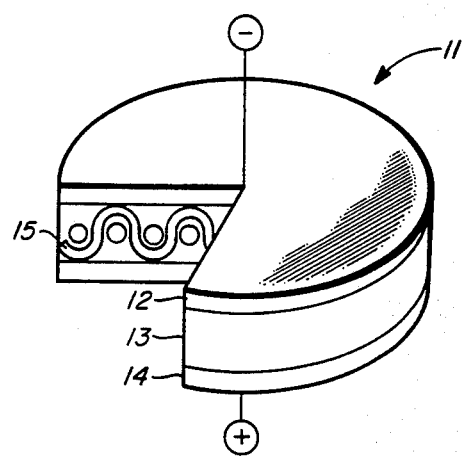
FIG. 1 is a schematic perspective view of a typical electrochemical cell according to the invention.

Referring now to the drawing figures, and particularly to FIG. 1, there is shown a schematic representation of a thermally activated electrochemical cell 11 according to the invention. Cell 11 comprises anode 12 which is constructed from a lithium-boron alloy. Also shown is cathode 14 which may be constructed of platinum, nickel or other commonly used metals according to conventional cell construction techniques. Between anode 12 and cathode 14 is electrolyte 13 which may be selected from the group of electrolytes consisting of lithium nitrate, a mixture of lithium nitrate with sodium nitrate, a mixture of lithium nitrate with potassium nitrate, or a mixture of lithium nitrate and sodium nitrate with potassium nitrate. Electrolyte 13 may conventionally be retained in position by a fiberglass separator 15 as is conventional in the art.

EXAMPLE I

A cell according to the invention was constructed utilizing anodes of lithium-boron. The anodes were constructed by punching discs 6.35 mm in diameter from lithium-boron foil 0.5 mm in thickness 5 in an argon-filled dry box and promptly spot welding the lithium-boron discs to a calcium-iron bimetal backing and spot welding a lead wire. The electrolyte was retained on a fiberglass filter paper disc which was dipped into molten electrolyte. The fiberglass filter paper discs were Gelman Type A, 0.3 mm in thickness and 6.35 mm in diameter.

This cell gave current densities over 300 $mA/cm^2$ with a usable temperature range of over 150° C. Anode open circuit potentials of about 3.2 V were found with little polarization at 100 $mA/cm^2$ and with very slight polarization at 300 $mA/cm^2$. At 260° C. there was a potential of over 3 V at a current density of 100 $mA/cm^2$. The lithium-boron alloy did not spot weld to nickel or stainless steel. Instead, it was spot welded to a calcium-iron bimetal to give the secure electrical contacts needed for the oxidizing environments. No chloride ion is needed to keep this cell operating. Previously, chloride was needed to depassivate the calcium anode. By way of comparison, calcium anodes which have previously been used in nitrate electrolytes have traditionally had maximum current densities of around 100 mA/cm$^2$ and maximum open circuit potentials of 2.8 V.

Problems involving lithium-boron anodes in molten salt cells utilizing a lithium chloride-potassium chloride electrolyte have been reported. For example see The Journal of the Electrochemical Society, Volume 129, p. 1168. These problems have been associated with the high temperatures used in such cells. By utilizing molten nitrates in the present invention the operating temperatures are reduced, resulting in fewer problems, although at temperatures above 350° C., deflagrations of the anode were often observed, particularly after discharge.

Electrolyte composition appears to be a key factor in determining the current density-potential and potential-temperature characteristics of the lithium-boron anode in molten nitrates. Experiments in equimolar lithium nitrate-potassium nitrate exhibited open-circuit anode potentials up to 0.2 V less electronegative to that seen in equimolar lithium nitrate-sodium nitrate electrolyte. In a like fashion at 300 mA/cm$^2$ and 300° C., the use of a lithium nitrate-potassium nitrate equimolar electrolyte resulted in lithium-boron anode potentials up to 0.45 V more positive than those seen in a lithium nitrate-sodium nitrate equimolar electrolyte and up to 0.85 V more positive than that seen in a lithium nitrate electrolyte. Single cell tests integrating the lithium-boron anode with existing silver ion cathode technology exhibited stable cell potentials in excess of 3 V at 300 mA/cm$^2$ at 300° C.

Figure 2:
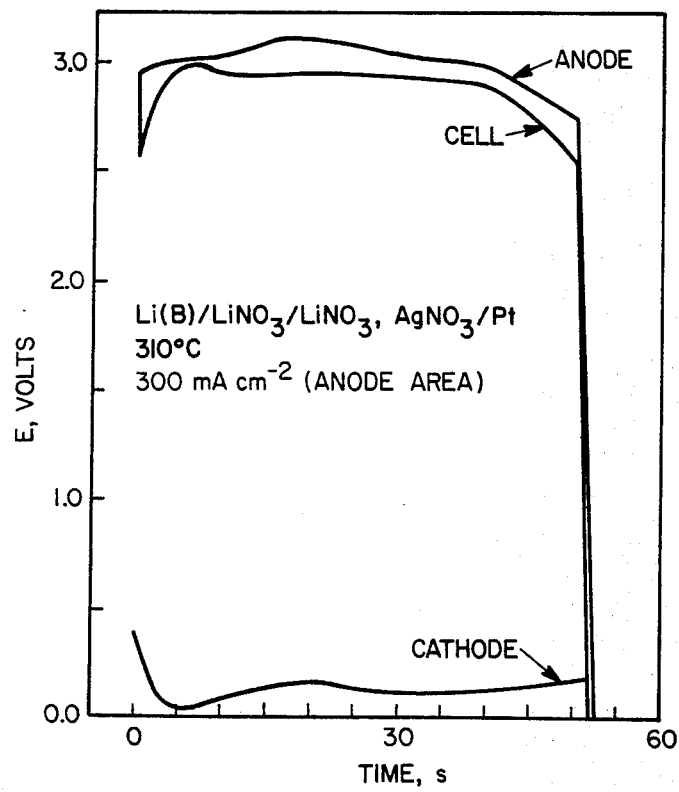
FIG. 2 is a plot of voltage versus time for a cell constructed according to the invention.

FIG. 2 illustrates current densities of 300 mA/cm$^2$ in cell voltages of approximately 3 V which were obtained. This cell construction featured the lithium-boron alloy anode in contact with a lithium nitrate binder wafer which in turn, contacted a layer of silver nitrate-lithium nitrate in binder with a platinum cathode current collector. During discharge, slight gassing was noted at the anode-electrolyte interface.

Figure 3:
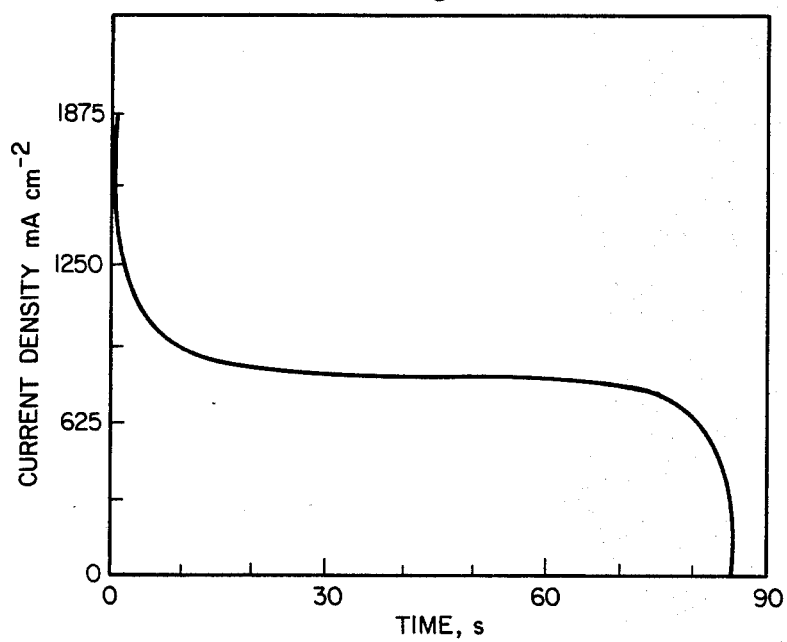
FIG. 3 is a plot of current density versus time at a fixed potential for the anode as utilized in the present invention.

Half cell studies of lithium-boron anode discharges revealed an extremely high current density capability when potentiostated at 80% of the peak open-circuit voltage. FIG. 3 demonstrates the potentiostatic discharge of a lithium-boron anode at minus 2.56 V versus the Ag$^+$/Ag reference electrode. The broad, flat characteristic curve corresponds to a current density of 780 mA/cm$^2$ which represents the maximum sustained current density in this experiment for the lithium-boron anode in molten lithium nitrate assuming an 80% peak voltage cutoff.

Figure 4:
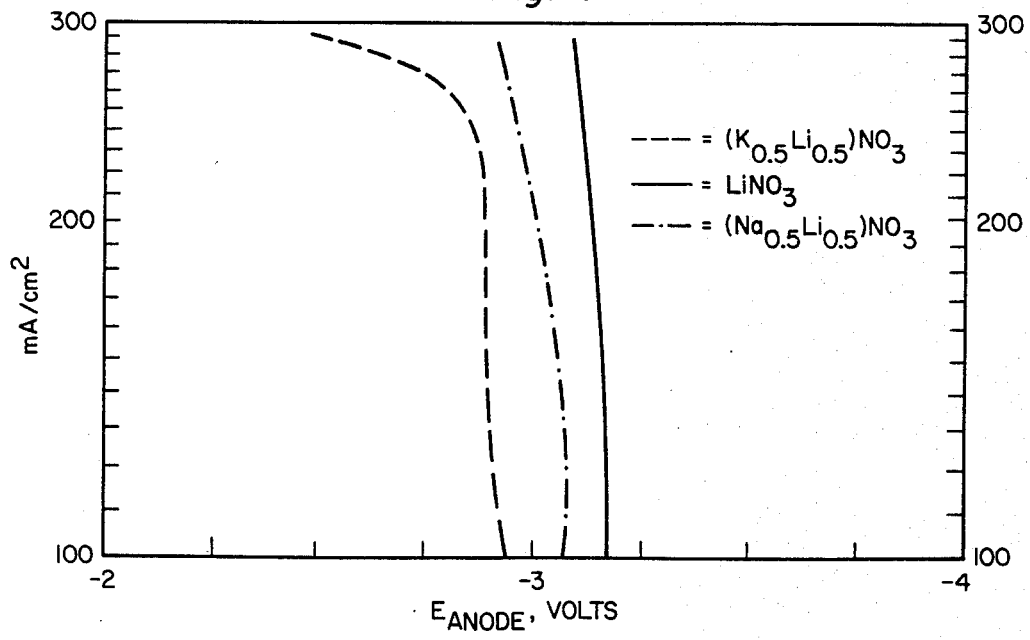
FIG. 4 is a plot of current density versus anode voltage for three different nitrate electrolytes.

The electrolyte composition is also a major factor in determining anode performance characterisitics below 350° C. FIG. 4 illustrates the effect of varying electrolyte composition on anode current-potential relationships at 300° C. It is evident that in equimolar lithium nitrate-potassium nitrate severe anode passivation occurs at 300 mA/cm$^2$ while in lithium nitrate and in equimolar lithium nitrate-sodium nitrate electrolytes much less polarization due to passivation is noted.

Figure 5:
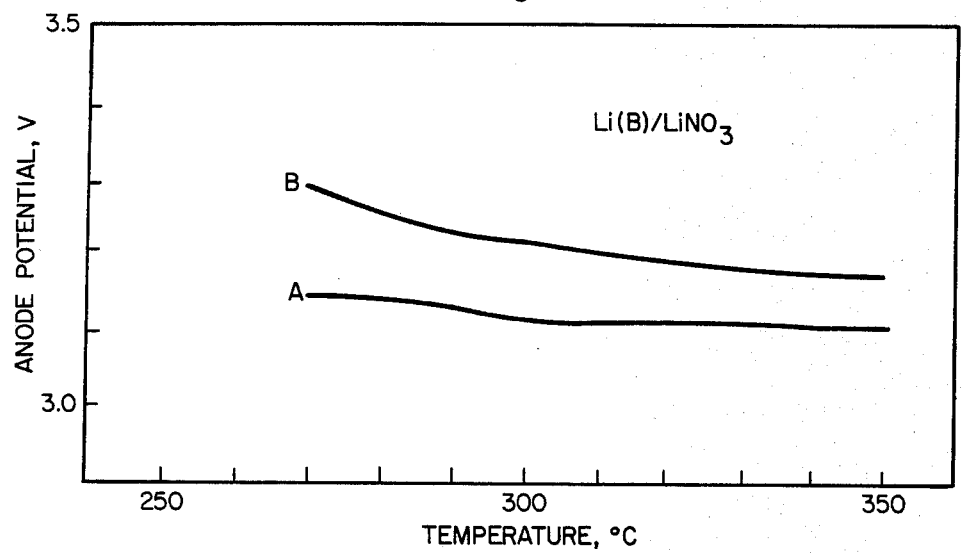
FIG. 5 is a plot of anode potential versus temperature at open circuit potential (B) and at 100 $mA/cm^2$ (A)
Figure 6:
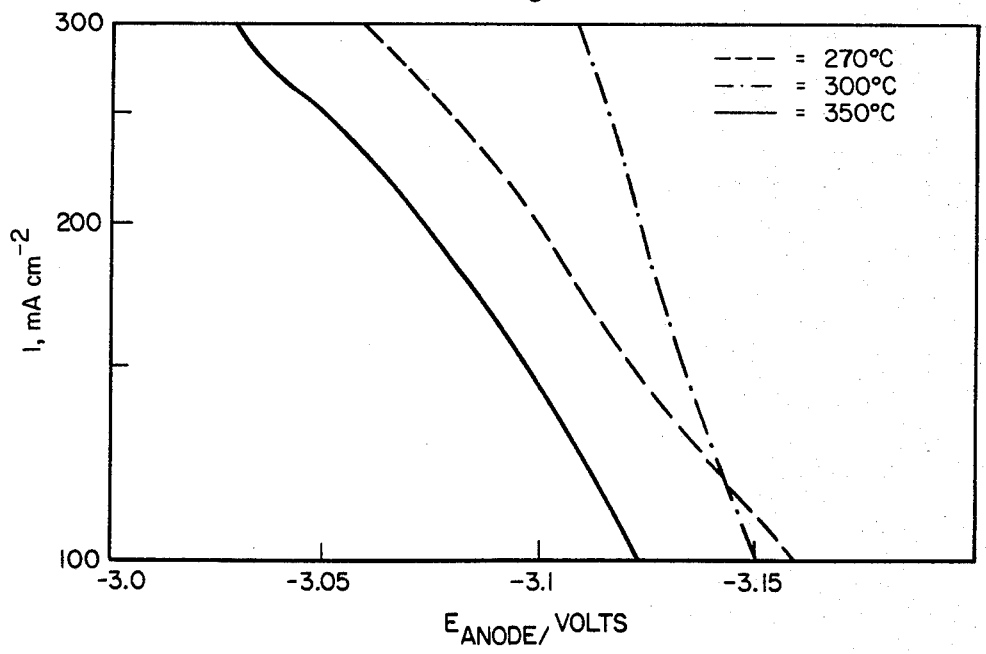
FIG. 6 is a plot of current density versus anode potential for three different temperatures in a lithium nitrate electrolyte.

As might be expected, a significant temperature-potential relationship is noted at an applied current. Anode potentials at open circuit and at 100 mA/cm$^2$ as a function of temperature are shown in FIG. 5. Also, FIG. 6 illustrates the effect of varying current density on anode potential at three fixed temperatures.

In summary, an examination of the lithium-boron alloy anode in molten nitrate electrolytes reveals high rate discharge characteristics in the temperature region 270° C. to 350° C. Galvanostatic studies show no appreciable anode polarization in molten lithium nitrate at 300 mA/cm$^2$. High current density polarization is more evident in lithium nitrate-sodium nitrate and lithium nitrate-potassium nitrate electrolytes. Above 350° C., anode degradation in molten nitrate electrolytes has been severe and deflagration may occur. This has been attributed to both an increase in the Li$_7$B$_6$ degradation reaction rate and to the increased mobility and fluidity of elemental lithium within the Li$_7$B$_6$ matrix.

Potentiostatic studies of the lithium-boron alloy anode at 300° C. in lithium nitrate at 80% peak open-circuit voltage reveal a flat discharge rate at approximately 780 mA/cm$^2$. This high current density is approximately an order of magnitude above that obtainable in conventional Ca/LiCl—KCl/CaCrO$_4$ thermal battery cells. Single cell tests at 300 mA/cm$^2$ utilizing a Ag$^+$ cathode in conjunction with the lithium-boron anode in molten lithium nitrate demonstrate concept feasibility at high rate discharges with cell voltages of approximately 3 V.

Figure 7:
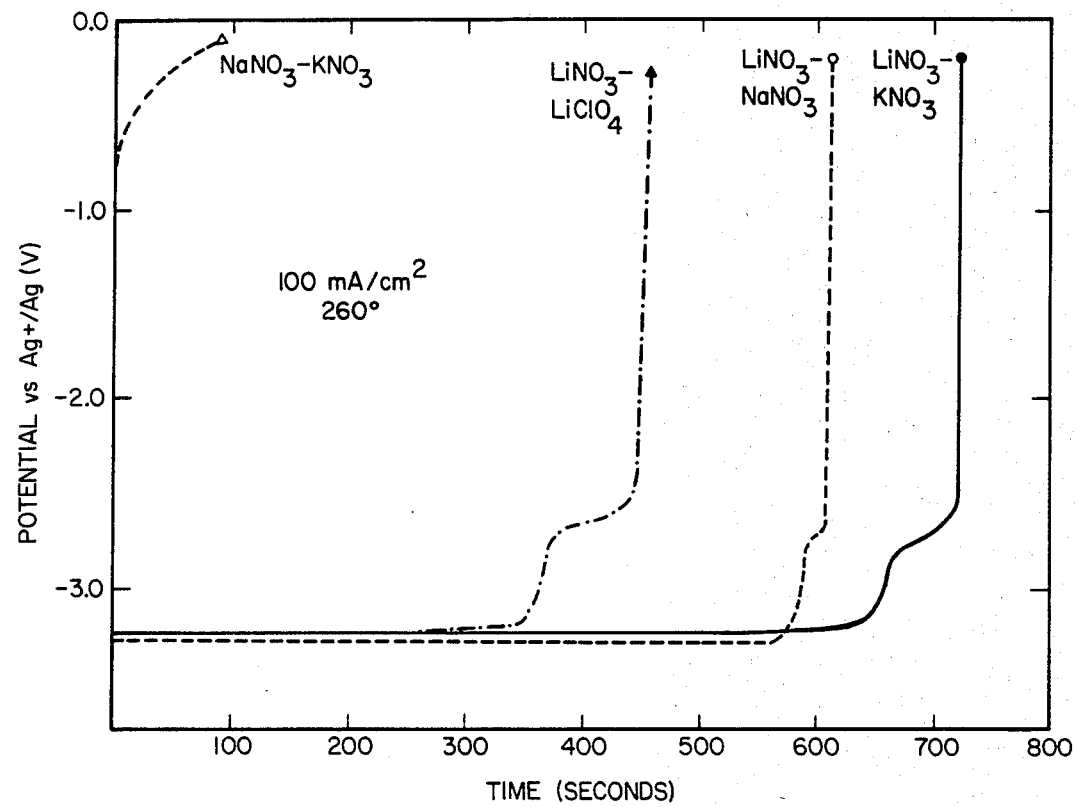
FIG. 7 is a plot of anode potential versus time in different molten nitrate electrolyte mixtures.

The discharge characteristics of the Li(B) anode in molten LiNO$_3$—KNO$_3$ improve markedly at temperatures above the melting point of lithium. These results show the importance of the liquid anode concept for high rate batteries. The Li(B) anode is quite stable in the LiNO$_3$—KNO$_3$ melt at temperatures up to 300° C. and yields current efficiencies exceeding 90%. This stability is lost in initially Li$^+$-free melts such as NaNO$_3$—KNO$_3$ where rapid deterioration of the anode is observed. These experimental results are explained by a thin passivating Li$_2$O film on the anode that is destabilized in melts having low lithium ion concentrations where oxides are converted to peroxides and superoxides. Experimental thermodynamic values for the Li(B)/LiNO$_3$—KNO$_3$/AgNO$_3$(0.17 m) cell at 250° C. are E=3.361 V, delta G=−324.3kJ, delta S=−61.2J/K and delta H=−356.3kJ. Thermodynamically, the Li(B) anode functions essentially as a lithium electrode. FIG. 7 illustrates the effect of nitrate electrolyte mixture on anode potential and shows the importance of lithium ions in the electrolyte. Without lithium ions, the potential of the anode is weak, but with lithium ions, the performance is substantially improved.

Obviously, many modifications and variations of the present invention are possible in light of the above teachings. It is therefore to be understood that within the scope of the appended claims the invention may be practiced otherwise than as specifically described.

We claim:
1. A thermally activated electrochemical cell, comprising:
   a cathode;
   an anode spaced from said cathode and made of a lithium-boron alloy; and
   an electrolyte disposed between and in contact with said anode and said cathode, said electrolyte selected from the group consisting of lithium nitrate, a mixture of lithium nitrate and sodium nitrate, a mixture of lithium nitrate and potassium nitrate, and a mixture of lithium nitrate and sodium nitrate with potassium nitrate.
2. A thermally activated electrochemical cell as set forth in claim 1 wherein said electrolyte comprises at least 20 weight percent lithium nitrate.

* * * * *